Dec. 2, 1924.

G. L. MATHER

MOLD

Filed Aug. 19, 1921

GEORGE L. MATHER
INVENTOR

BY Hadley Freeman
ATTORNEY

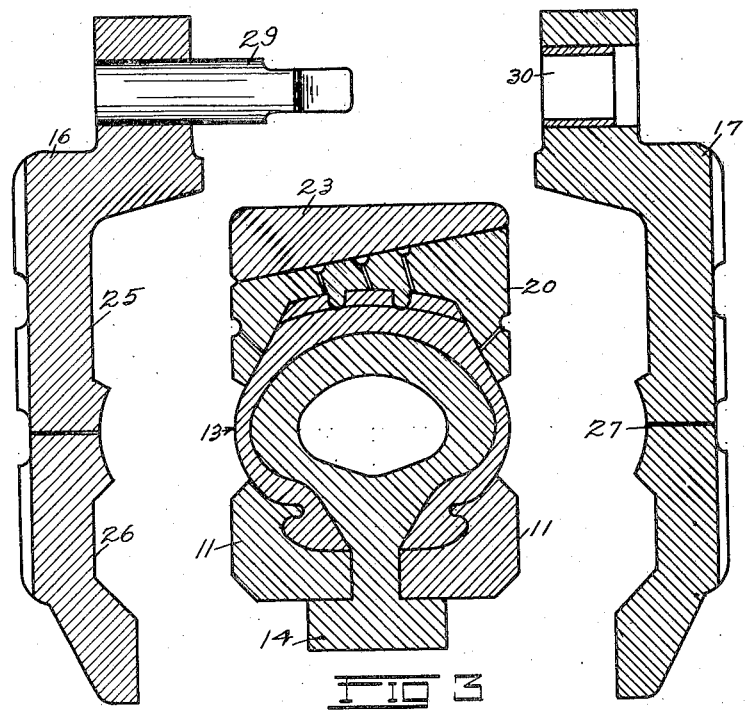
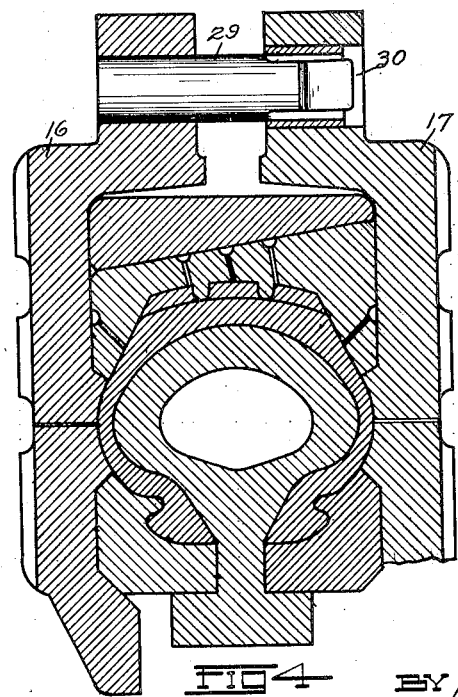

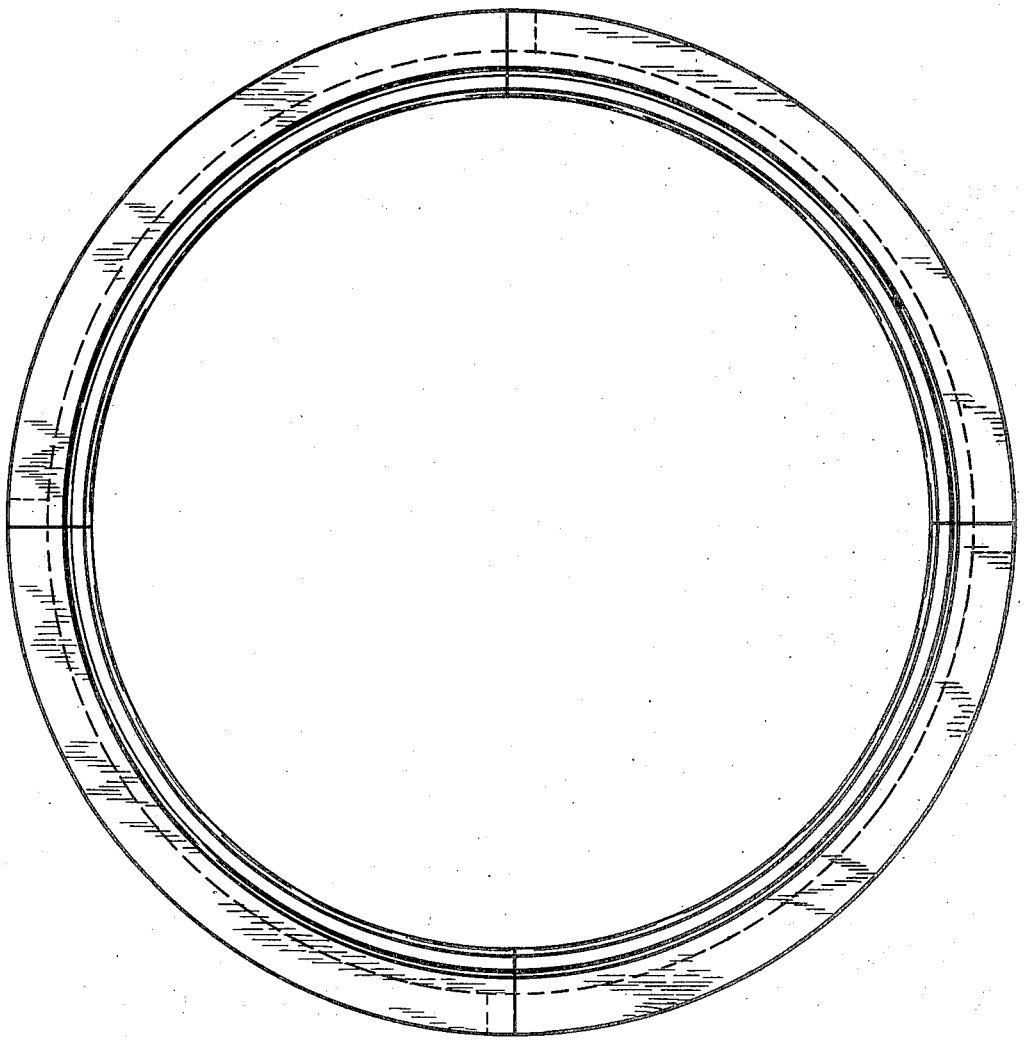

Patented Dec. 2, 1924.

1,517,850

UNITED STATES PATENT OFFICE.

GEORGE L. MATHER, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

MOLD.

Application filed August 19, 1921. Serial No. 493,522.

*To all whom it may concern:*

Be it known that I, GEORGE L. MATHER, a citizen of the United States, and a resident of Milwaukee, in the county of Milwaukee and State of Wisconsin, have invented certain new and useful Improvements in Molds, of which the following is a specification.

My invention relates to molds and the principal object of my invention is to provide a new and improved mold. In the drawings accompanying this specification and forming a part thereof I have shown, for purposes of illustration, one form which my invention may assume. In these drawings:

Figure 3 shows the tread rings in position,

Figure 4 shows the assembled mold, while

Figure 5 shows the tread plates in more detail.

Figure 1:
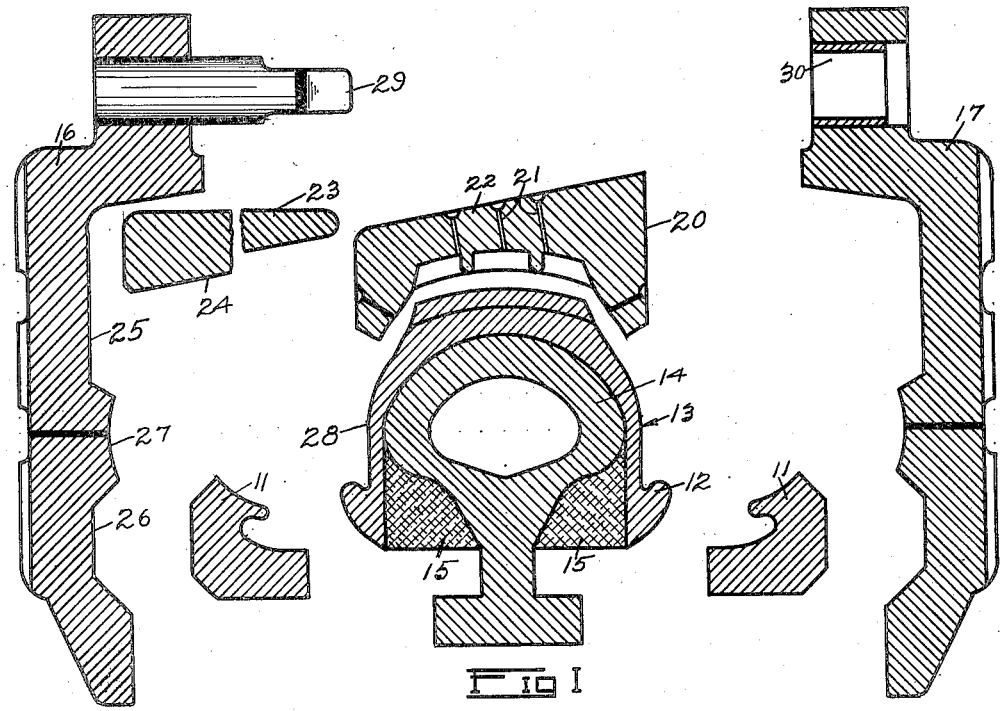
Figure 1 is a sectional view of my mold showing the parts in exploded position.
Figure 2:
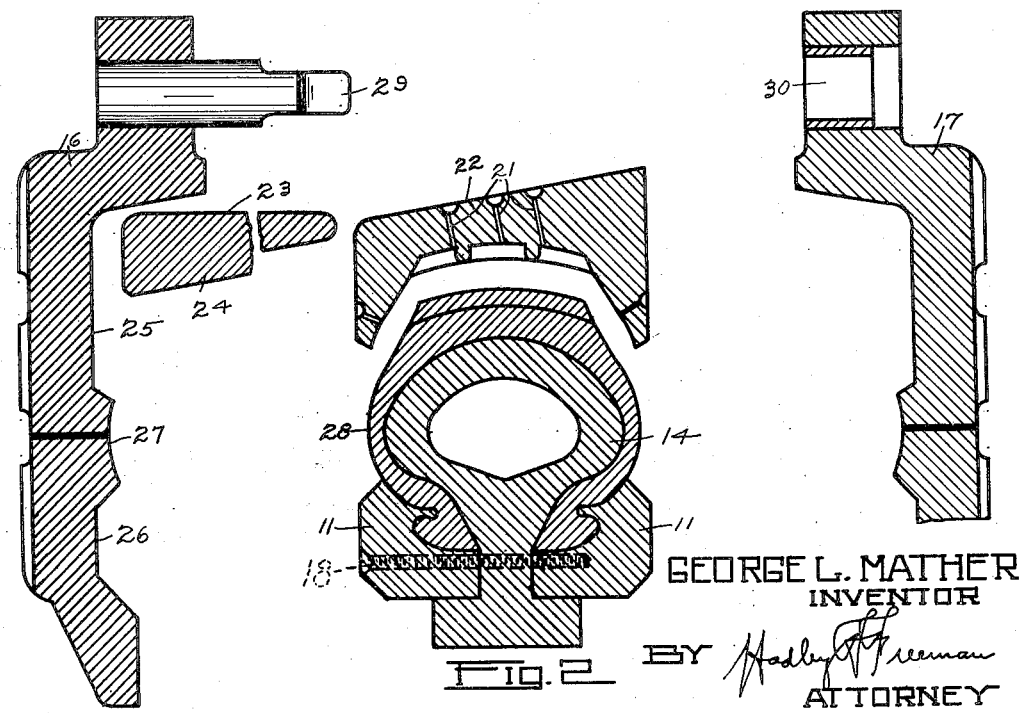
Figure 2 shows the bead rings applied.

The mold herein shown comprises a pair of bead rings 11 adapted to engage and position the beads 12 of a casing 13 which is mounted upon a rigid core 14 and may have been constructed thereon by the aid of core pads 15. The bead rings 11 may be integral or unitary with the mold sections 16 and 17 but are shown as separate and accordingly as adapted to be separately moved into position abutting the core 14 as shown in Figure 2 in which position they may be secured by any suitable means such as the bolts 18.

The tread portion 19 of the casing 13 is engaged by a plurality of tread plates 20 preferably four in number provided on the inner surface with a suitable tread design, held in alignment in any desired manner, pierced by the vents 21, and having an outer surface 22 formed as a segment of a cone substantially co-axial with the casing 13. A ring 23 is provided having an inner face 24 adapted to cooperate with the outer faces 22 of the plates 20 in such manner that reciprocatory motion of the ring 23 substantially in the direction of the axis of the casing 13 will cam the plates 20 inwardly into the position shown in Figure 3 to thereby full-mold the tread portion 19 between the plates 20 and the core 14.

The mold sections 16 and 17 are provided with suitable recesses 25 and 26 adapted to receive the unit as shown in Figure 3 and with mold faces 27 adapted to engage the side walls 28 of the casing 13 to thus fullmold these side walls between the faces 27 and the core 14 as shown in Figure 4. The section 16 is provided with a pin 29 adapted to enter an aperture 30 in the section 17 to thus compel registration of the sections. The ring 23 may be positioned in any suitable manner as by ram pressure applied on one side to the ring 23 and on the other side to the plates 20 or the ring 23 may be proportioned as shown and engaged by the recess 25 of the section 16 as the plates 20 are engaged by the recess 25 of the section 17 whereby ram pressure applied to the sections 16 and 17 will reciprocate the ring 23 over the plates 20 and thereby position these plates.

It will be understood that various modifications and changes may be made in the herein described apparatus and that I have not attempted to describe or indicate all such alternatives. The disclosure herein is therefore illustrative only and my invention is of course not limited thereto.

I claim:

1. A mold comprising a pair of co-operating mold sections, a plurality of tread plates, projecting side wall molding surfaces on said mold sections, and reciprocating means independent of said mold sections adapted to contract said plates, said last named means being positively engaged by said mold sections.

2. A mold comprising a pair of cooperating mold sections, independent bead rings, a plurality of tread plates each provided with a cam surface on its exterior face, and means independent of said mold sections adapted to be reciprocated along said cam surfaces to thereby contract said plates.

3. A mold comprising a pair of cooperating mold sections, independent bead rings, a plurality of tread plates having conical exterior faces, and a ring having an inner face cooperable with said conical exterior faces and adapted to be forced over said plates to thereby contract said plates.

4. A mold comprising a pair of co-operating mold sections, provided with recesses, a plurality of tread plates, reciprocating means independent of said mold sections adapted to contract said plates, said tread plates and contracting means being receivable in said recesses, side wall molding surfaces on said mold sections adjacent said recesses, and independent bead rings adapted to be guided into position by said mold sections.

In testimony whereof I have signed my name to the above specification.

GEORGE L. MATHER.